April 19, 1960  P. A. HEISE  2,933,278
ADJUSTABLE MOUNTING FOR A VIEW FINDER
Filed Feb. 21, 1955
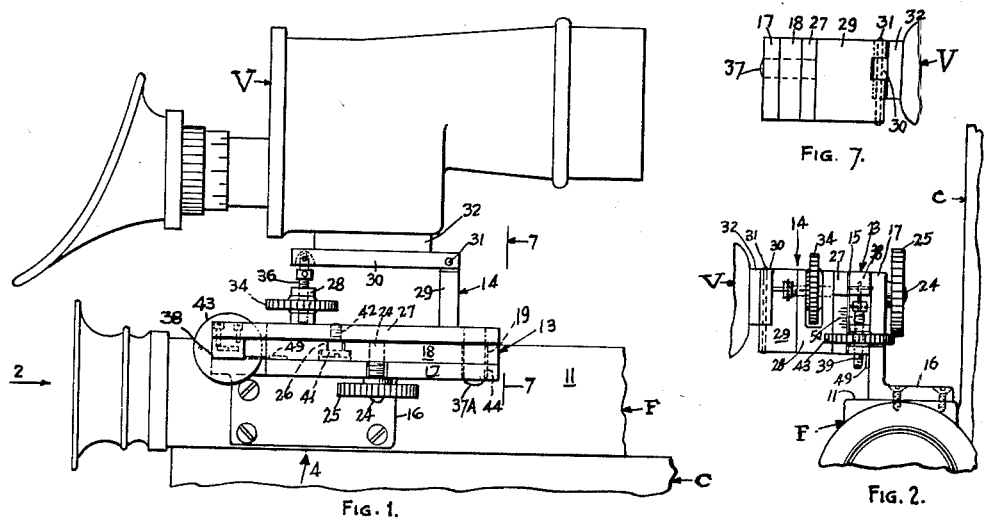
Fig. 1.  Fig. 2.  Fig. 7.
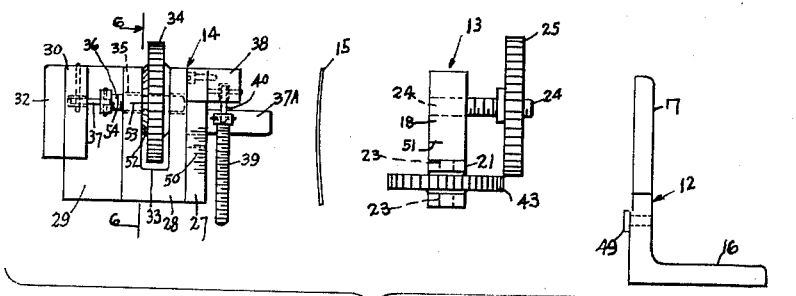
Fig. 3.
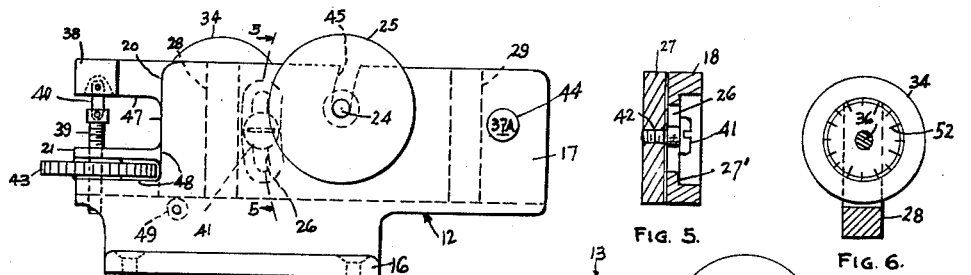
Fig. 4.  Fig. 5.  Fig. 6.
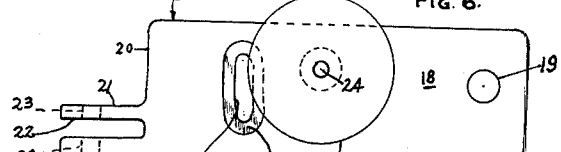
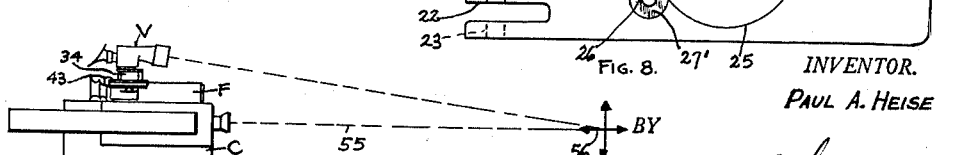
Fig. 9.  Fig. 8.
INVENTOR.
PAUL A. HEISE
ATTORNEY United States Patent Office 2,933,278
Patented Apr. 19, 1960

2,933,278
ADJUSTABLE MOUNTING FOR A VIEW FINDER
Paul Alexis Heise, Pasadena, Calif.
Application February 21, 1955, Serial No. 489,591
3 Claims. (Cl. 248—226)

This invention relates to view finders for cameras and deals with a means for mounting such finders on cameras, more particularly with a mounting means for this purpose which embodies adjustments for correcting parallax between the axis of the finder optical system and the photographing lens of the camera.

To those versed in the art of photography, it is well known that most cameras are equipped with a secondary optical system, set to one side of the photographing lens for observing and defining the field seen by the photographing lens. This is commonly known as the view finder. Due to this offset position of the finder with respect to the photographing lens, it is necessary to correct for parallax between the two optical systems to bring the fields subtended by each system into coincidence.

It is the primary object of this invention to provide a view finder of the character described wherein a double movement is provided in the means that mounts the finder on the camera for correcting parallax between the optical axes of the finder system and the photographing lens.

Another object is the provision of means for detachably mounting a view finder on a camera case in any suitable or convenient place.

Briefly stated, my invention amounts to incorporating in a finder mounting means, two adjustable movements at right angles to each other. The resultant movement will be essentially a universal movement upon which the finder is supported. This movement is utilized to bring the optical axis of the finder system into various aligned positions with respect to the optical axis of the photographing lens, dependent on the focal distance of the subject field, so that the fields subtended by the photographing lens and the finder lens coincide. The combination of the two movements permits the finder system to be trained on any field at any distance from any position on any camera, and a reticule in the finder system may be used to define the same boundaries of the finder field as seen by the photographing lens of the camera. Suitable indicia, such as calibrations, may be associated with the two movements for indicating fixed positions of the finder for various focal distances of the photographing lens as determined by the distances of the fields to be photographed.

The foregoing described article when coupled with a high powered monocular view finder will provide an extremely useful finder for cameramen, both professional and amateur, who require close refining of the photographic field under all conditions of photography, and particularly during motion picture photography.

Other objects and advantages will become apparent as the description proceeds in conjunction with the drawing in which;

Fig. 1 is a plan view, partly fragmentary, showing how my invention would be applied to a camera;

Fig. 2 is an end view, taken in the direction of the arrow 2 of Fig. 1;

Fig. 3 is an exploded view, slightly enlarged, showing the parts of my invention;

Fig. 4 is a side elevation, slightly enlarged, taken in the direction of the arrow 4 of Fig. 1;

Fig. 5 is a section on line 5—5 of Fig. 4;

Fig. 6 is a section on line 6—6 of Fig. 3;

Fig. 7 is a view taken on line 7—7 of Fig. 1;

Fig. 8 is a side elevation of the intermediate plate, and

Fig. 9 is a schematic view showing how my invention would be used in connection with a motion picture camera.

Referring to the drawing and particularly to Fig. 1, it will be seen that I have illustrated my invention in connection with a motion picture camera, generally designated C, shown fragmentarily. The camera is shown as B being equipped with a regulation finder, generally designated F, also shown in part. Since neither the camera nor the finder are any part of this invention, only insofar as they provide means for illustrating my invention in connection with a camera, they may be entered without further comment or description.

Although the following description and remarks will be directed to a motion picture camera having a particular type of finder, it is intended that the kind of mounting shown in my invention shall be applicable to all types of cameras having any type of finder available, the only requirement being a suitable place on the camera for mounting my invention thereon.

As shown, the finder F is formed with a flat upper face 11, and it is upon this face that I choose to mount my invention. It will be noted that even when I mount my invention on the regulation finder of the camera, the use of this finder is in no wise impaired.

Broadly speaking, my invention consists of the parts shown in Fig. 3. Here there is an angle member, generally designated 12, an intermediate member, generally designated 13, a bracket generally designated 14, and a shim 15, which in this instance is a piece of Phosphor bronze. When assembled and mounted on a camera, these parts take the appearance shown in Fig. 2.

In assembling these parts, the shim 15 goes between the intermediate member 13 and the bracket 14, and the two parts are slidably held together by an arrangement shown in Figs. 4 and 5.

Referring to Figs. 1, 3 and 4, for a detailed description of the parts shown in these views, it will be seen that the member 12 consists of a short section of angle iron having legs 16 and 17, the leg 16 being used for attaching the iron to a camera, in this instance the top of the finder F, and the leg 17 being left upstanding as a flange for use in mounting the bracket and the intermediate member on the camera.

A detailed side view of the intermediate member 13 is shown in Fig. 8. In this view, it can be seen that the member 13 is formed in the shape of a flat plate 18 having a hole 19 near one end. On the opposite end, the plate is cut back to form a vertical shoulder 20 and leave an extending horizontal portion 21 having a slot 22 cut therein. The extending portion 21 is drilled to form aligned holes 23. In the central portion of the plate 18, I fix a a stud bolt 24 upon which a thumb nut 25 is screw threadedly mounted. Between the stud bolt 24 and the cut away portion of the plate 18, I form an arcuate slot 26 with the hole 19 as a center. The slot is formed with shoulders 27' for slidably receiving a nut, which will be described later.

The shim 15 is for the purpose of providing a sliding bearing surface between the intermediate member 13 and the bracket 14 when they are coupled together. To provide a working pressure bearing surface between the two members, it may be slightly dished, as shown.

The bracket 14 consists of plate member 27, similar in size and shape to the plate 18 of the intermediate member 13. On the plate 27, I mount two outstanding members 28 and 29, and on the outer end of the member 29, I hingedly mount another plate member 30, as shown at 31. The member 30 carries a monocular view finder, generally designated V, suitably mounted thereon by means of a plate 32.

Means is provided for moving the member 30 on its hinged axis 31 to provide the movement for correcting horizontal parallax. For this purpose, I form a vertical slot 33 in the member 28 and mount a thumb nut 34 in the slot. The member 28 is further drilled, as shown at 35, to slidably receive a screw threaded rod 36, which is screw threadedly received by the thumb nut 34. Thus turning of the nut 34 will move the rod 36 in and out of the hole 35. The rod, in turn, is connected to the hinged member 30 by means of a small link 37, which is pivotally connected, at opposite ends, to the rod 36 and the member 30, respectively. Any movement of the rod will transmit movement to the member 30 and will move the view finder V in or out in a horizontal plane and thus provide the movement for correcting parallax in that plane. Near one end of the plate 27, I mount a smooth stud bolt 37a which extends outwardly far enough to pass through the plate 18 of the intermediate member and also the leg 17 of the member 12. On the opposite end of the plate 27, I mount a block 38 and to this block I connect a screw threaded rod 39 by a small link 40, similar to the link 37, pivotally connected at opposite ends to the block and the rod respectively.

In practice, I assemble the intermediate member 13, the shim 15 and the bracket 14 as a unit before mounting on the upstanding flange 17. I accomplish this through the arcuate slot 26 in the member 13. First, the stud bolt 37a is passed through the hole 19 in the plate 18 of the intermediate member 13 with the shim 15 placed between the two members. They are slidably held together by means of a cap screw 41 working in the arcuate slot 26. The screw 41 is shouldered against the plate 27 in a screw threaded hole 42. By using a shouldered screw, the amount of pressure brought to bear between the two members may be regulated. When assembled, the unit appears as shown in Figs. 1 and 2. However, during assembling and before the members are coupled by the screw 41, a thumb nut 43 is inserted into the slot 22 and the rod 39 is passed through the aligned holes 23 and is screw threadedly received by the nut. Any turning of the nut 43, will move the plate 27 on its pivot 37a relative to the member 13 and will thus bring about a vertical movement of the plate 27 on its pivoted axis of rotation, which may be used to correct for vertical parallax. This movement in conjunction with the horizontal movement will provide the necessary movements for complete correction of parallax, regardless of where the finder is placed on the camera.

My invention also provides means for detachably mounting a finder of the character described on a camera, such as a motion picture camera. For this purpose, I have provided the upstanding flange 17 on the member 12 with a hole 44 adapted to receive the stud bolt 37a extending from the member 27. As before stated, the member 13 is provided with a screw threaded stud bolt 24 having a thumb nut 25 mounted thereon, in the central portion of the plate 18. Also, when the member 13 and the bracket 14 are locked together, the stud bolt 37a extends through the hole 19 far enough to form a pivot for the mounting of the assembled unit on the flange 17 carried by the camera. To do this, the stud bolt 37a is inserted into the hole 44 in the flange and the unit is then swung downwardly on its pivot until the stud 24 fits into an arcuate slot 45 in the flange 17. The thumb nut 25 may then be tightened and the whole assembly will be locked in place, ready for use. It will be noted that the end of the plate 18 is cut back, as shown at 20 for purposes of assembling and that the plate 27 is cut as shown at 47 to permit relative movement between the plates 18 and 27. The flange 17 is also cut as shown at 48 to permit assembling and the necessary relative movements between the plates.

To produce a quickly detachable and fully serviceable mount for the purpose described, my invention provides means for establishing a fixed position on the camera, whereby the finder V may be mounted and dismounted at will and each time returned to the same position. This feature is essential for correct calibration of the different positions of the finder movement for the various distances and should be quick and accurate. For this purpose, I fix a stop arrangement in the form of a button 49 mounted in the flange 17 so as to engage the lower edge of the plate 18 and hold it in a fixed position until it is clamped against the member 13 by the thumb nut 25. The apparatus is then ready for use.

In using my invention, the whole assembly is mounted on the camera in the manner explained, and the finder V trained for each shot. To provide greater utility and ease of operation, I provide calibrations for both the horizontal and the vertical movements, which may be marked for distances corresponding to the distances shown on the lens calibrations for focal distances.

In Fig. 3, I have shown one form of marking which may be used successfully. Here it will be seen I have provided a series of markings 50 on the member 27, and a single mark 51 on the plate 18 of the member 13. Since these two markings come opposite each other, and all the movement occurs between these two plates for vertical adjustments, such markings will furnish indicia which may be calibrated as before stated.

For the horizontal markings, reference is made to Figs. 3 and 6. In Fig. 3, it will be observed that the wheel 34 carries a series of markings 52 and the member 28 carries a single mark 53. Fig. 6 shows the marks on the wheel to better advantage. For greater latitude of movement of the horizontal adjustment, an additional series of marks 54 may be placed on the rod 35. These marks may be used to denote complete revolutions of the wheel 34 and the marks on the wheel used for fine adjustments.

In Fig. 9, I have shown a schematic arrangement to illustrate the two movements provided by my invention. Here it will be observed that the finder V is offset from the optical axis of the camera lens, represented by the dotted line 55. The correction for this parallax is made through the nut 34 and a fast and accurate setting of the finder may be made through the calibrations mentioned. For vertical adjustment, in the direction of the arrow 56, the thumb nut 43 would be turned and the adjustment made in the same manner as for the horizontal parallax. The combination of the two movements will provide an accurate adjustment for parallax in all planes, regardless of where the finder is mounted on the camera.

Having disclosed my invention, and having set forth the objects and advantages thereof, what I claim as new is as follows.

I claim:

1. For use with a camera having an upstanding flange with a hole near one end and an arcuate slot near the intermediate portion of said flange, means for adjustably mounting a view finder on said flange, said means comprising, an intermediate plate, a pin mounted on said plate arranged to slidably fit in said arcuate slot, means for adjustably and detachably holding said pin fixed in said slot, said plate also having a hole adapted to coincide with the hole in said flange when the above mentioned pin is mounted in said arcuate slot, a first plate, a first pin mounted on said first plate adapted to slidably pass through the above mentioned coincided holes in said intermediate plate and said flange, means for holding said intermediate plate and said first plate in sliding facial engagement, means for adjustably rotating said first plate about said first pin relative to said intermediate plate, a second plate pivotally mounted near one end thereof on said first plate arranged to swing at right angles to the above mentioned movement of said first plate, means for adjustably moving said second plate on its pivot, and means for mounting a view finder on said second plate.

2. The element of claim 1 wherein the means for adjustably rotating said first plate about said first pin relative to said intermediate plate, comprises a thumb nut rotatably mounted on said intermediate plate and a screw threaded rod engaged by said thumb nut connected to said first plate adapted to move said first plate relative to said intermediate plate upon turning of said thumb nut.

3. The elements of claim 1 wherein the means for adjustably moving said second plate on its pivot comprises a thumb nut rotatably mounted on said first plate and a screw threaded rod engaged by said thumb nut connected to said second plate adapted to move said second plate on its pivot upon turning of said thumb nut.

References Cited in the file of this patent

UNITED STATES PATENTS

| | | |
|---|---|---|
| 1,842,224 | Wells | Jan. 19, 1932 |
| 2,296,674 | Ingels | Sept. 22, 1942 |
| 2,330,335 | Collins | Sept. 28, 1943 |
| 2,367,127 | Johansson | Jan. 9, 1945 |

FOREIGN PATENTS

| | | |
|---|---|---|
| 1,027,073 | France | of 1953 |